(12) United States Patent
Linhart et al.

(10) Patent No.: US 11,311,824 B2
(45) Date of Patent: Apr. 26, 2022

(54) FILTER SYSTEM, FILTER, AND METHOD

(71) Applicant: MANN+HUMMEL GmbH, Ludwigsburg (DE)

(72) Inventors: Jochen Linhart, Schwaikheim (DE); Mahesh Srinivas, Bengaluru (IN)

(73) Assignee: MANN+HUMMEL GmbH, Ludwigsburg (DE)

( * ) Notice: Subject to any disclaimer, the term of this patent is extended or adjusted under 35 U.S.C. 154(b) by 147 days.

(21) Appl. No.: 16/790,230

(22) Filed: Feb. 13, 2020

(65) Prior Publication Data

US 2020/0179833 A1     Jun. 11, 2020

Related U.S. Application Data

(63) Continuation of application No. PCT/EP2018/072103, filed on Aug. 15, 2018.

(30) Foreign Application Priority Data

Aug. 15, 2017 (DE) .......................... 102017007653.7
Aug. 15, 2017 (DE) .......................... 102017007654.5

(51) Int. Cl.
*B01D 27/08* (2006.01)
*B01D 35/30* (2006.01)
*B01D 35/00* (2006.01)

(52) U.S. Cl.
CPC ........... *B01D 27/08* (2013.01); *B01D 35/005* (2013.01); *B01D 35/30* (2013.01); *B01D 35/306* (2013.01);

(Continued)

(58) Field of Classification Search
CPC ...... B01D 27/08; B01D 35/005; B01D 35/30; B01D 35/306; B01D 2201/0415; B01D 2201/29; B01D 2201/291; B01D 2201/304; B01D 2201/4023; B01D 2201/347; B01D 2201/4007; B01D 2201/4046; B01D 2201/4076; B01D 27/106; B01D 35/16;

(Continued)

(56) References Cited

U.S. PATENT DOCUMENTS

2020/0179845 A1* 6/2020 Linhart ................ B01D 27/106

FOREIGN PATENT DOCUMENTS

DE          10353424 A1    6/2005
DE      102007009352 A1    8/2008
(Continued)

*Primary Examiner* — Madeline Gonzalez

(57) ABSTRACT

A filter system for liquid has a filter head with drainage channel and stop element. A filter cartridge is mounted by screw-in movement at the filter head and has a support ring rotatably fastened to its housing part. The support ring has an eccentric closure element and a first positioning element guided toward the stop element by the screw-in movement to position the support ring at the filter head in a rotational position for axially aligning closure element and drainage channel. The closure element is transferred axially into a sealing seat at the filter head to close the drainage channel when screwing on the filter cartridge. The support ring has a second positioning element holding the support ring in a rotationally fixed position at the filter head when unscrewing the filter cartridge so that the closure element is moved out of the sealing seat only in an axial direction.

20 Claims, 7 Drawing Sheets

(52) U.S. Cl.
CPC .. *B01D 2201/0415* (2013.01); *B01D 2201/29* (2013.01); *B01D 2201/291* (2013.01); *B01D 2201/304* (2013.01); *B01D 2201/4023* (2013.01)

(58) Field of Classification Search
CPC ............ B01D 35/153; B01D 2201/301; B01D 2201/31; F01M 2011/031; F01M 1/10; F01M 11/03; F16N 39/06
USPC ......... 210/450, DIG. 17, 440–444, 248, 282, 210/459, 493.2
See application file for complete search history.

(56) References Cited

FOREIGN PATENT DOCUMENTS

| | | | | |
|---|---|---|---|---|
| DE | 102008049006 A1 | 4/2010 | | |
| DE | 202009002455 U1 * | 7/2010 | ........... | B01D 35/153 |
| DE | 202009002455 U1 | 7/2010 | | |
| DE | 102010005980 A1 | 8/2011 | | |
| DE | 202011105968 U1 | 12/2011 | | |
| DE | 202011104690 U1 | 1/2012 | | |
| DE | 202012000417 U1 | 5/2012 | | |
| DE | 102015103662 A1 | 9/2016 | | |
| DE | 102015214068 A1 | 1/2017 | | |
| EP | 3120914 A1 | 1/2017 | | |
| WO | 2009083285 A1 | 7/2009 | | |
| WO | 2016004365 A1 | 1/2016 | | |

\* cited by examiner

FILTER SYSTEM, FILTER, AND METHOD

CROSS-REFERENCE TO RELATED APPLICATIONS

This application is a continuation application of international application No. PCT/EP2018/072103 having an international filing date of 15 Aug. 2018 and designating the United States, the international application claiming a priority date of 15 Aug. 2017, based on prior filed German patent application No. 10 2017 007 654.3, and a priority date of 15 Aug. 2017, based on prior filed German patent application No. 10 2017 007 653.7, the entire contents of the aforesaid international application and the aforesaid two German patent applications being incorporated herein by reference.

BACKGROUND OF THE INVENTION

The invention relates to a filter system for a liquid medium to be filtered, in particular, fuel or oil, in particular lubricant oil, in particular, for the internal combustion engine of a motor vehicle. The filter system comprises a filter head with a bottom-side drainage channel for the fluid and with a stop element, as well as a filter that can be mounted on the filter head by means of a screw-in movement directed about its longitudinal axis. At one end, the filter comprises a support ring that is fastened at the filter so as to be rotatable relative to the longitudinal axis, wherein the support ring comprises an eccentrically arranged closure element for the drainage channel and a first positioning element, which can be guided toward the stop element of the filter head by means of the screw-in movement in order to position the support ring relative to the filter head in a predetermined rotational position with the closure element axially aligned relative to the drainage channel so that the closure element can be transferred, through an axial movement of the filter derived from the screw-in movement, into its sealing seat at the filter head for closing the drainage channel.

A filter system as mentioned above is disclosed, for example, in WO 2009/083285 A1. In the known filter system, the filter is configured as a replaceable filter cartridge with an integral housing part. When the filter is demounted from the filter head, the support ring with the closure element arranged thereon is inevitably rotated relative to the filter head opposite to the screw-in movement of the filter and is pulled in the axial direction as well as laterally out of its sealing seat at the filter head due to the mutual threaded engagement of the replaceable filter cartridge and the filter head. This may cause a substantial lateral load on the closure element that, as the case may be, adheres to the sealing seat at the filter head. In the worst of scenarios, this may lead to parts of the closure element or the entire closure element being torn off. Fragments remaining in the filter head may lead to loss in functional efficiency of the fluid filter or to damage of units arranged in fluid communication downstream of the filter system. Moreover, in the known filter system, the closure element cannot be configured as a sealing plug that is insertable into the drainage channel and is characterized by an especially reliable sealing performance.

It is therefore the object of the invention to provide a filter system of the aforementioned kind and a filter for such a filter system which offer, with unchanged simple handling, an improved protection of the closure element against damage.

SUMMARY OF THE INVENTION

The object pertaining to the filter system is solved by a filter system according to the invention, wherein the support ring of the filter in the filter system comprises a second positioning element by means of which the support ring is held rotationally fixed at the filter head when an unscrewing movement of the filter opposite to the screw-in movement is performed relative to the filter head in order to release the closure element from its sealing seat so that the closure element can be moved out of its sealing seat only in axial direction.

By means of the second positioning element, a rotational adjustment of the support ring about the longitudinal axis of the filter is thus blocked when performing an unscrewing movement of the filter opposite to the screw-in movement. In this context, the second positioning element may be supported in particular at the aforementioned stop element of the filter head or even at a rotational stop arranged so as to be spaced apart from the stop element and thereby (initially) prevent an undesired co-rotation of the support ring with the filter. By an axial movement of the filter away from the filter head that is derived from the unscrewing movement, the closure element can be moved axially, in particular strictly axially, out of its sealing seat and an excessive lateral load on the closure element can be prevented in this way. Tearing off of parts of the closure element or of the entire closure element from the support ring can thus be reliably counteracted. The second positioning element forms an anti-rotation protection for the support ring or the closure element arranged thereon until the closure element is reliably removed from its sealing seat in the axial direction and the second positioning element is disengaged in the circumferential direction of the support ring from its overlap with a corresponding rotational stop, in particular the stop element, of the filter head in the axial direction. In the filter system according to the invention, the closure element may also readily be configured as a closure plug that, in the sealing seat, projects at least with sections thereof into the drainage channel of the filter head and thus offers an especially reliable sealing performance.

The support ring can be embodied in a constructively simple and inexpensive manner as one piece. The support ring may also be embodied of multiple parts, in particular in segments, in order to simplify manufacture and assembly. In a further embodiment, the support ring comprises a contour raised in axial direction above the closure element and the two positioning elements; in this way, the stability during transport can be optimized additionally in a constructively simple way; the support ring can be embodied for this purpose as one piece or as a multi-part configuration, in particular in segments.

According to the invention, the two positioning elements may be arranged at the support ring spaced apart from each other so far that the stop element of the filter head can be introduced between the two positioning elements in sliding clearance positive locking action or with only slight clearance. In this way, an especially secure guidance of the support ring on the stop element in axial direction can be achieved. According to the invention, the two positioning elements may be configured especially pin-shaped or web-shaped.

According to the invention, the second positioning element preferably does not extend as far as the first positioning element away from the end face of the filter in axial direction. The second positioning element with its free axial end that faces away from the end face of the filter is thus arranged axially recessed in the direction toward the end face relative to the corresponding free axial end of the first positioning element. When mounting the filter on the filter head, it can be ensured in this way that the first positioning element, and not the second positioning element, is the first to abut against the stop element arranged at the filter head. With the first positioning element abutting against the stop element, a further screw-in movement of the filter then effects an exclusively axial displacement of the support ring in the direction toward the drainage channel. Thereby, the stop element can engage between the two positioning elements or be guided between them. In this way, assembly errors can be prevented.

According to an alternative embodiment, the positioning elements may also extend to the same extent away from the support ring in axial direction. In other words, the free ends of the two stop elements may also be arranged at the same level in axial direction. In this case, the two positioning elements are preferably arranged offset relative to each other in radial direction, i.e., spaced apart from the longitudinal axis of the filter at different lengths. In this case, the stop element constitutes two stop regions for the positioning elements which are arranged offset relative to each other in axial and in radial directions so that, when mounting the filter (being moved in screw-in direction) on the filter head, always only the first positioning element abuts, or is the first one to abut, against the stop element. In a further embodiment, the two positioning elements can be arranged in a substantially identical radial position between the outer and inner circumferential contour of the support ring; in this way, it is ensured in a constructively simply way that only the filter that matches the intended application can be employed.

The stop for the two positioning elements in the filter head can be embodied preferably with a longer axial extension away from the end face of the filter head than the top edge of the discharge channel.

According to the invention, the two positioning elements may be arranged at the end face and/or circumferentially at the support ring. When the positioning elements are molded circumferentially onto the support ring, then a mechanical stable connection of the positioning elements to the support ring can be achieved thereby in a simplified way.

According to the invention, the closure element may extend, in particular in the axial direction, away from the support ring.

According to a preferred embodiment of the invention, the closure element is configured as a closure plug which can be introduced, at least with sections thereof, in axial direction into the drainage channel. In this case, the closure plug serves, at least partially, as a radial sealing element. Additionally or alternatively, the closure plug can be adapted to the shape of the drainage channel. In one embodiment, the closure element can be embodied in a kidney shape, for example. In this context, kidney-shaped means that the closure element comprises a substantially round or elliptical base surface and comprises a depression or indentation in the outer contour so that the sign of the direction of curvature of the outer contour changes at least once, wherein the depression or indentation divides the base surface into two regions, in particular rounded regions. In this context, the division can be symmetric but also asymmetric so that two regions of the same surface area are produced or the first region comprises a greater surface area than the second region. This embodiment has the advantage that the positioning precision can be assured in a constructively simple way; in other words, the sealing means meets, constructively simply ensured, the sealing seat and covers it reliably.

For the purpose of an especially reliable sealing performance, the closure element may be provided with an elastomeric radial and/or axial sealing element or may be embodied as such an elastomeric radial and/or axial sealing element. In this way, a reliable fluid-tight sealing of the drainage channel can be ensured. According to the invention, the closure element may comprise a seal holder structure, preferably embodied as an annular groove, for the aforementioned radial/axial sealing element. This eliminates an additional gluing or molding by foaming of the sealing element to the closure element.

In further embodiments, the closure element can be arranged adjacent to the first and/or to the second positioning element. The positioning elements can be arranged, for example, in relation to the support ring (360°, first quadrant $\alpha=0\text{-}90°$; second quadrant $\alpha=90\text{-}180°$; third quadrant $\alpha=180\text{-}270°$, fourth quadrant $\alpha=270\text{-}360°$), at an angle of the arc a at a spacing to the closure element, and the positioning elements can be arranged, for example, oppositely positioned to the closure element, in relation to the support ring. Adjacent in the meaning of the invention means in this context that the closure element and the first as well as the second positioning element are preferably arranged in two adjacent quadrants of the support ring, particularly preferred in one quadrant of the support ring. In case that the closure element and the positioning elements are arranged in two adjacent quadrants of the support ring, the closure element can be arranged in a first quadrant of the support ring and the positioning elements can be arranged in a second quadrant of the support ring. Alternatively, the closure element and the first or the second positioning element can also be arranged in the first quadrant of the support ring and the respective other positioning element in a second quadrant adjacent thereto. Oppositely positioned means in the context of the invention that the closure element is arranged on a first semicircular segment of the support ring and the first and the second positioning elements on the second semicircular segment of the support ring, wherein the center of the closure element and the center of the spacing between the two positioning elements preferably form the respective reference point and wherein these reference points are preferably arranged oppositely positioned relative to each other.

According to the invention, the second positioning element of the support ring may have an end face run-up slope for the stop element for an especially simple mounting of the filter system with little disturbance. In this way, an undesirable canting of the second positioning element at the stop element can be counteracted during mounting of the filter at the filter head.

In terms of manufacturing aspects, the two positioning elements are preferably molded onto the support ring. The support ring can thereby be produced in an especially cost-effective manner and with minimal manufacturing tolerance by way of a plastic injection molding process. This is especially advantageous in mass production of the filter.

According to the invention, the filter is embodied as a replaceable filter cartridge. A replaceable filter cartridge, also referred to as spin-on filter, in the meaning of the application is a filter cartridge that cannot be opened without being destroyed; it comprises a housing with a cover wherein the housing is made in particular of metal or plastic material. In the housing, a filter element is arranged, in particular a ring-shaped filter element. The housing comprises preferably a cover section with an inlet, an outlet, and a sealing seat arranged at the cover section. The outlet is preferably centrally provided in a first cover section, the sealing seat is preferably concentrically arranged relative to the outlet at the second cover section, and the inlet arranged in the cover, in particular in the second cover section, is located preferably between the outlet and the sealing seat. The outlet comprises preferably a thread.

The housing part of the filter that forms the cover comprises in a further embodiment a first inwardly arranged cover section with a central flow opening and a second outwardly arranged cover section. The second outwardly arranged cover section is fluid-tightly connected here with the cup-shaped housing section of the housing part, for example, crimped or welded. The first cover section of the housing part comprises preferably an (inner) thread by means of which the filter according to the invention can be screwed into an (outer) thread of a connecting socket of the filter head. In a further embodiment, a circumferential sealing ring can be arranged at the end face of the housing part. The sealing ring can be provided in addition with a sealing lip for circumferential seal-tight contact at the filter head. In further embodiments, a seal holder ring for the sealing ring can be provided wherein the seal holder ring forms a part of the second cover section. In a preferred embodiment, the seal holder ring is connected with form fit to the housing part of the filter, in particular crimped or welded.

The replaceable filter cartridge according to the invention is mountable at the filter head by means of a screw-in movement directed about its longitudinal axis, wherein the replaceable filter cartridge at one end comprises a support ring which is fastened at the especially cup-shaped housing part of the replaceable filter cartridge so as to be rotatable relative to the longitudinal axis of the replaceable filter cartridge, wherein the support ring comprises an eccentrically arranged closure element for the drainage channel and a first positioning element that can be guided by means of the screw-in movement against the stop element of the filter head in order to position the support ring relative to the filter head in a predetermined rotational position in which the closure element is arranged axially aligned relative to the drainage channel so that the closure element, by means of an axial movement of the filter derived from the screw-in movement, can be transferred into its sealing seat at the filter head for drainage channel, wherein the support ring comprises a second positioning element by means of which the support ring is held rotationally fixed at the filter head when an unscrewing movement of the filter opposite to the screw-in movement is performed in order to release the closure element from its sealing seat so that the closure element can be moved out of its sealing seat only in axial direction.

In a further embodiment, the second positioning element is formed at the support ring such that the support ring, by contact of the second positioning element at the stop element, can be secured rotationally fixed relative to the filter head.

In a further embodiment of the filter, at least one of the two positioning elements, preferably both positioning elements, extends in a radial direction away from the support ring. The two positioning elements are preferably arranged either within the support ring circumference or outside of the support ring circumference. In a further embodiment, the first and/or the second positioning element extends in axial direction away from the end face of the filter past the closure element, wherein the first positioning element extends farther than the second positioning element.

In a preferred embodiment, a return flow-blocking membrane is provided additionally in the housing of the filter at the raw side and, in the installed position, is arranged at the raw side of the filter and prevents return flow of the liquid medium, for example, of an oil.

Further features of the filter according to the invention are described above in the context of the description of the filter system according to the invention.

Such replaceable filter cartridges comprise thus an integral housing part in which a filter element is arranged. The replaceable filter cartridges are especially easy and convenient in regard to handling and are mostly used in the so-called main flow where the entire fluid flow flows through the filter. In this case, the support ring may be rotatably fastened, in particular at a cover section of the housing part of the replaceable filter cartridge. From both construction-related and production-related perspectives, the support ring is preferably hooked onto the filter, in particular, its cover section, i.e., held or connected by means of an undercut.

According to an alternative embodiment of the invention, the filter may also be configured as a filter insert to be replaceably arranged in a filter housing. This enables an especially cost-efficient replacement of the filter. In this case, the filter system comprises a filter housing comprising the filter head and a housing part configured as a housing cover that can be screwed into the thread of the filter head. The filter head is preferably configured in a cup shape or as a housing cup that serves for accommodating the filter and can be closed by the housing cover. In this construction, the filter is advantageously held at the housing part, configured as housing cover, in a rotationally fixed and axially positionally fixed manner. This may be achieved, for example, in that the filter is latched at the housing cover. Alternatively, the filter may also be arranged so as to be held in frictional engagement at the housing part. Overall, a co-rotation of the filter can thus be ensured when the housing cover is screwed into the thread of the filter head and also when the housing cover is unscrewed from the filter head.

When the filter is configured as a conventional filter insert for an openable filter housing with the filter head and a housing cover, the support ring according to the invention may then be arranged, in particular latched, at an end plate or a support tube of the filter in order to enable a simple and cost-efficient manufacture of the filter.

The filter according to the invention for a filter system as described above is configured according to the invention as a replaceable filter cartridge or as an (individually replaceable) filter insert. The filter is characterized by a particular simple and secure handling.

The method according to the invention for insertion or exchange of a filter of a filter system according to the invention comprises the steps:

attaching a replaceable filter cartridge, comprising a filter element arranged in a housing of the replaceable filter cartridge, to a filter head;

mounting the replaceable filter cartridge at the filter head by means of a screw-in movement directed about a longitudinal axis, wherein the filter comprises at one end a support ring which is fastened at the housing part of the replaceable filter cartridge so as to be rotatable relative to the longitudinal axis of the replaceable filter cartridge, wherein the support ring comprises an eccentrically arranged closure element for the drainage channel and a first positioning element that can be guided against the stop element of the filter head by means of the screw-in movement;

positioning the support ring relative to the filter head in a predetermined rotational position with the closure element arranged axially aligned relative to the drainage channel;

transferring the closure element by an axial movement of the replaceable filter cartridge derived from the screw-in movement into its sealing seat at the filter head for closing the drainage channel, wherein the support ring comprises a second positioning element by means of which the support ring is held rotationally fixed at the filter head when an unscrewing movement of the filter opposite to the screw-in movement is performed in order to release the closure element from its sealing seat so that the closure element can be moved out of its sealing seat only in axial direction.

An exchange of the filter according to the invention can be provided additionally as a preceding step for release and removal of a filter to be exchanged by an unscrewing movement oppositely directed relative to the screw-in movement, wherein the support ring during release of the closure element from its sealing seat at the filter head is held rotationally fixed so that the closure element can be moved only in axial direction out of the sealing seat.

The invention will be described in further detail in the following with the aid of two embodiments depicted in the drawings.

DESCRIPTION OF PREFERRED EMBODIMENTS

Figure 1:
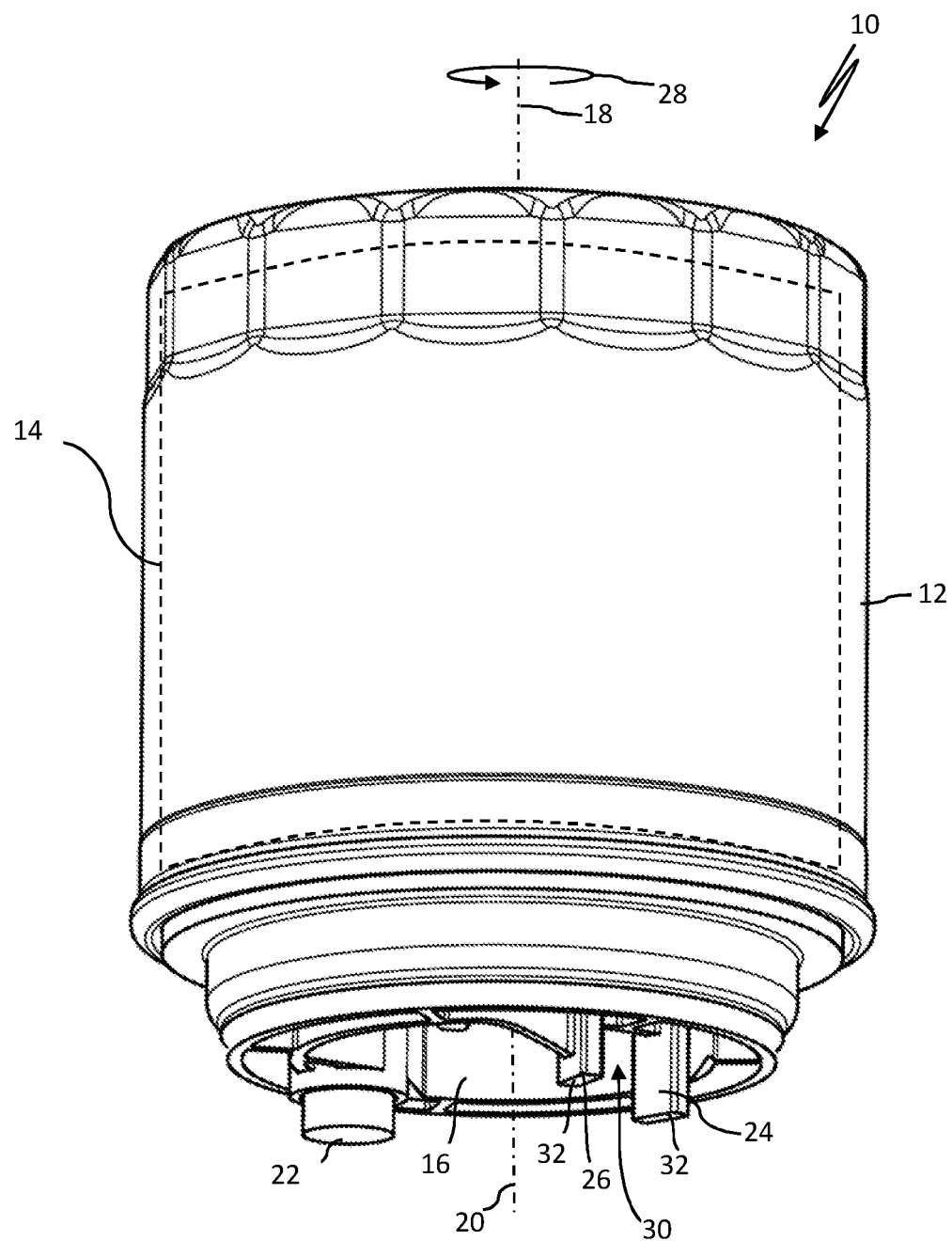
FIG. 1 shows a filter, embodied as a replaceable filter cartridge, with a support ring arranged at an end face and comprising a closure element and two positioning elements, in a perspective view.

FIG. 1 illustrates a filter 10, configured as a replaceable filter cartridge, for filtering a fluid, which, for example, is a lubricant oil for an internal combustion engine. The filter 10 comprises here a housing part 12, comprising a cover, with a filter element 14 that is arranged in the housing part 12 and is illustrated very schematically by dashed line in FIG. 1. A support ring 16 is arranged at one end at the filter 10. The support ring 16 surrounds in a ring shape the longitudinal axis 18 of the filter or the longitudinal axis 20 of the filter element 14 coinciding therewith. The support ring 16 is supported at the housing part 12 of the filter 10 so as to be rotatable, i.e., freely rotatable, about the longitudinal axis 18 and may be configured, for example, as an injection-molded plastic part. A closure element 22 is arranged at the support ring 16. The closure element 22 extends away from the support ring 16 in an axial direction. The closure element 22 may be comprised, in particular, of a rubber-elastically deformable material, i.e., an elastomer. Furthermore, first and second positioning elements 24, 26 are arranged at the support ring 16. The two positioning elements 24, 26 are preferably molded onto the support ring 16. Both positioning elements 24, 26 extend from the end face away from the support ring 16 in axial direction. Both positioning elements 24, 26 are oriented so as to run in parallel to one another and are arranged so as to be spaced apart from one another in circumferential direction of the support ring 16. It should be noted that the second positioning element 26 is arranged in front of the first positioning element 24 in the direction of a screw-on or screw-in movement, identified by 28, of the filter 10 onto a connecting socket of a filter head, illustrated in more detail in FIG. 2. A gap or receptacle 30 is thereby formed between the two positioning elements 24, 26. Here, the first positioning element 24 projects past the second positioning element 26 in axial direction. In other words, the free axial end 32 of the second positioning element 26 is spaced apart less far from an end face of the filter 10 than the free axial end 32 of the first positioning element 24.

Figure 2:
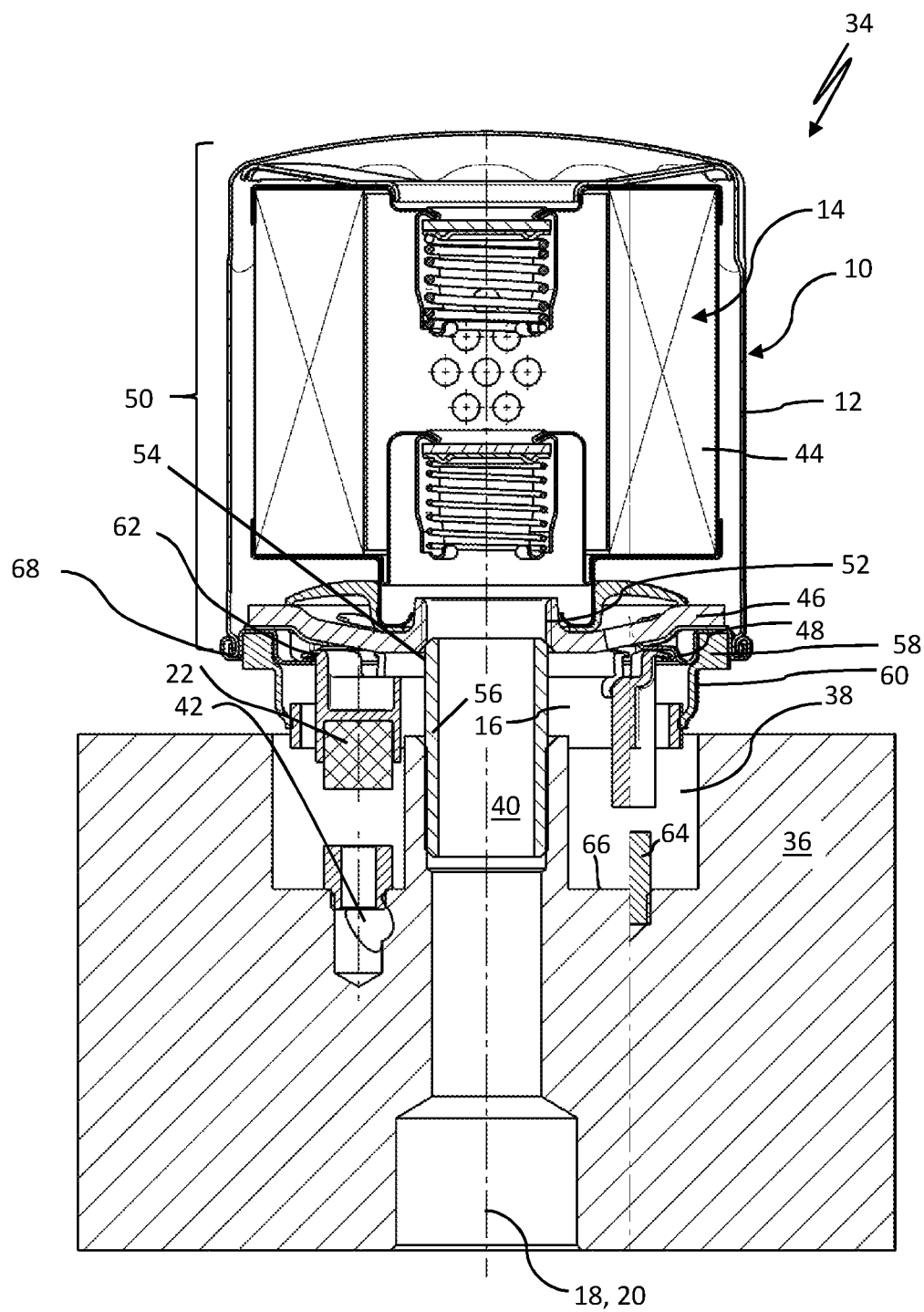
FIG. 2 shows a filter system with a filter according to FIG. 1 and with a filter head that comprises a drainage channel to be closed by the closure element of the filter in a section illustration, during mounting of the filter at the filter head.

FIG. 2 illustrates a filter system 34 for filtering a fluid, in particular, fuel or oil, in particular lubricant oil, for the internal combustion engine of a motor vehicle (not shown). The filter system 34 comprises a filter 10 according to FIG. 1 and a filter head 36 on which the filter 10 with the filter element 14 arranged therein is to be mounted.

The filter head 36 is illustrated very schematically in FIG. 2 and comprises a raw side inlet channel 38 (only partially represented) for the fluid to be filtered and an outlet channel 40 for the filtered fluid arranged at the clean side. A bottom-side drainage channel, identified by 42, of the filter head 36 serves for emptying out fluid contained in the filter 10 and allowing the fluid to escape, following gravity, via the filter head 36 when the filter 10 is replaced. In this way, undesired discharge of fuel or oil into the surrounding environment of the filter system 34 can be prevented. This also simplifies as a whole an environmentally-friendly disposal of the filter 10. The drainage channel 42 may be, for example, connected in fluid communication to an oil pan or to a fuel tank (not shown). In the operative state of the filter system 30, the drainage channel 42 is closed in a fluid-tight manner due to the closure element 22 of the replaceable filter cartridge that is fastened to the support ring 16. In this way, the fluid can be pumped through the filter 10 during filter operation and, at the same time, undesired outflow of the fluid via the drainage channel 42 can be prevented.

As can be seen in the section view of the filter system 34 in FIG. 2, the filter element 14 comprises a filter medium 44 that surrounds the longitudinal axis 20 of the filter element in an annular manner. The filter element 14 consequently is configured as a so-called round filter element. The filter medium 44 may be pleated in the shape of a star in order to obtain a functional filter surface as large as possible. The filter medium 44 may be arranged so as to be held between two end plates of the filter element 14. Other configurations of the filter element 14 are also readily conceivable.

The housing part 12 of the filter 10 comprises a cover with a first internally arranged cover section 46 having a central flow opening and a second externally arranged cover section 48. Here, the second external cover section 48 is connected, for example, crimped or welded, in a fluid-tight manner to the cup-shaped housing section 50 of the housing part 12. The first cover section 46 of the housing part 12 comprises an (inner) thread 52 via which the filter 10 can be screwed onto an (outer) thread 54 of a connecting socket 56 of the filter head 36. A circumferential sealing ring 58 is arranged at the end face of the housing part 12. According to FIG. 2, the sealing ring 58 may have a sealing lip 60 for circumferential sealing contact at the filter head 36. In embodiments, the second cover section 48 can comprise in particular a seal holder ring 68 for the sealing ring 58. In a preferred embodiment, the seal holder ring 68 is connected with form fit to the housing part 12 of the filter, in particular crimped or welded.

The support ring 16 may be hooked onto the housing part 12 for the purpose of simple and cost-efficient mounting. In this case, the support ring 16 comprises one or more hook elements 62 facing the filter element. Here, the hook elements 62 engage in an exemplary fashion behind the second cover section 48. A different type of rotatable fastening of the support ring 16 at the housing part 12 of the replaceable filter cartridge 10 is conceivable.

The filter head 36 comprises a stop element 64 arranged at the bottom side and serving as a rotational stop for the support ring 16. According to FIG. 2, the stop element 64 may extend in particular away from the bottom section 66 of the filter head 36 in an axial direction. The filter head 36 may be comprised of metal, for example, aluminum. The stop element 64 may be molded onto the filter head 36, but may also be configured as a component separate from the filter head 36. In the latter case, the stop element 64 may be comprised especially of plastic.

When the filter 10 is screwed onto the outer thread 54 of the filter head 36, the support ring 16 is first moved together with the filter 10 in screw-in direction 28. The mutual threaded engagement of the filter 10 and of the filter head 36 results then in an advancing movement of the filter 10 axially in the direction of the drainage channel 42 or of the stop element 64 of the filter head 36. In the mounting state of the filter at the filter head 36, shown in FIG. 2, the two positioning elements 24, 26 of the support ring 16 are still arranged so as to be axially spaced apart from the stop element 64. In other words, the stop element 64 does not yet extend into a rotational path (not shown) of the first positioning element 24 or of the second positioning element 26 of the support ring 16.

Figure 3:
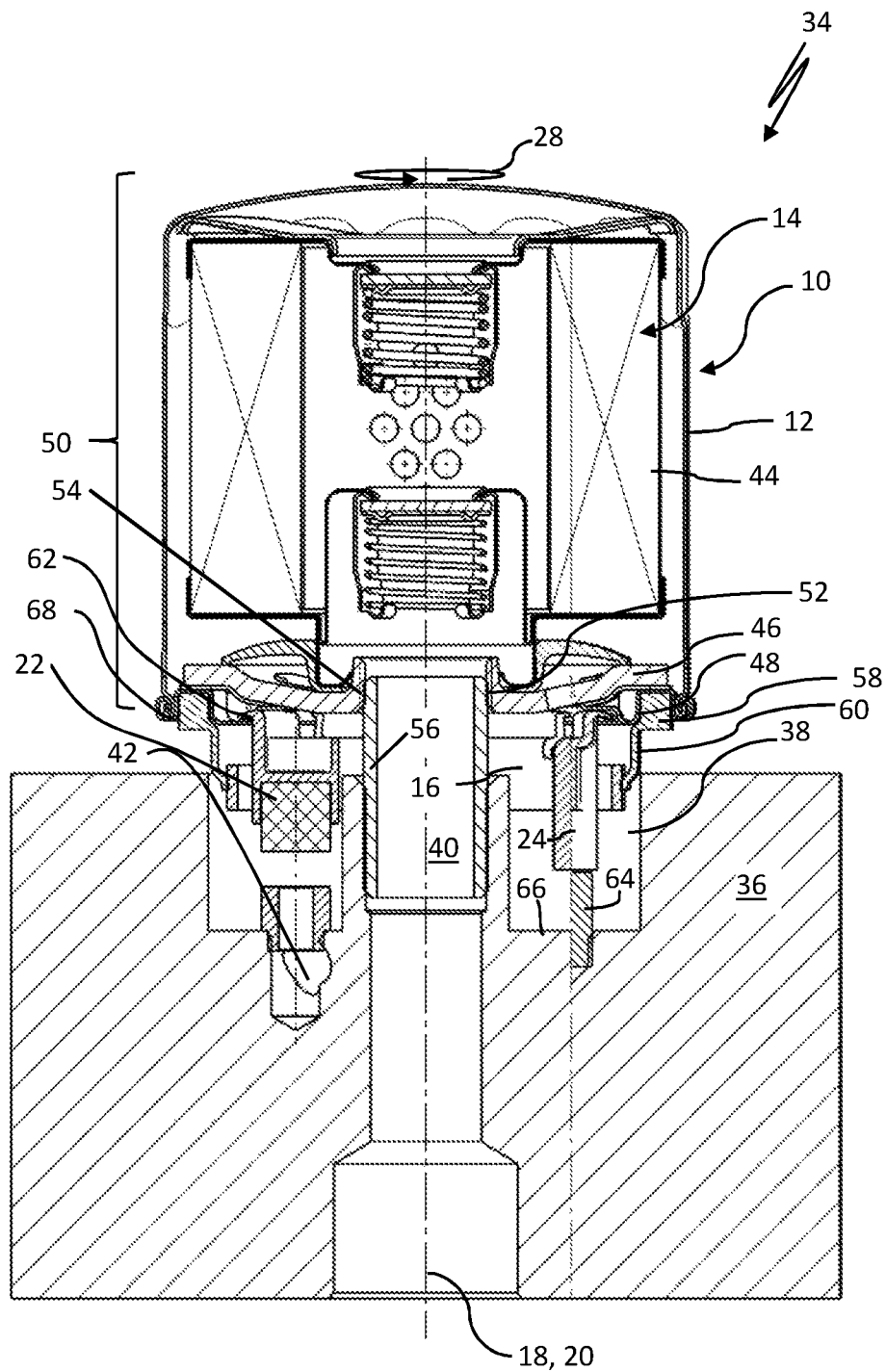
FIG. 3 shows the filter system according to FIG. 2 during mounting at a later point in time.

FIG. 3 illustrates the filter system 10 during mounting at a later point in time compared to FIG. 2. The filter 10 has been screwed even further onto the connecting socket 56 of the filter head 36. The first positioning element 24 of the support ring 16 has almost reached the stop element 64 in axial direction. On further rotation of the filter 10 in the screw-in direction 28, the first positioning element 24 of the support ring 16 will abut against the stop element 64 and the support ring 16 is locked thereby in a predetermined rotational position relative to the filter head 36 with the closure element 22 axially aligned relative to the drainage channel. A further co-rotation of the support ring 16 with the filter 10 in the screw-in direction 28 is thereby prevented. By completely screwing in the filter 10 into the thread of the filter head 36, only an exclusively axial adjustment movement of the support ring 16 is therefore caused until the filter 10 is arranged in the predetermined mounting position at the filter head 36, illustrated in FIG. 4. In the predetermined mounting position of the filter 10 at the filter head 36, the closure element 22 is arranged in its sealing seat at the filter head 36. In this context, the closure element 22 abuts seal-tightly in axial direction against a wall region of the bottom section 66 of the filter head 36 that circumferentially delimits the drainage channel 42. In this case, the closure element 22 is consequently configured as an axial sealing element. At the same time, the sealing ring 58 of the housing part 12 of the replaceable filter cartridge abuts in a circumferentially sealing manner against the filter head 36.

Figure 4:
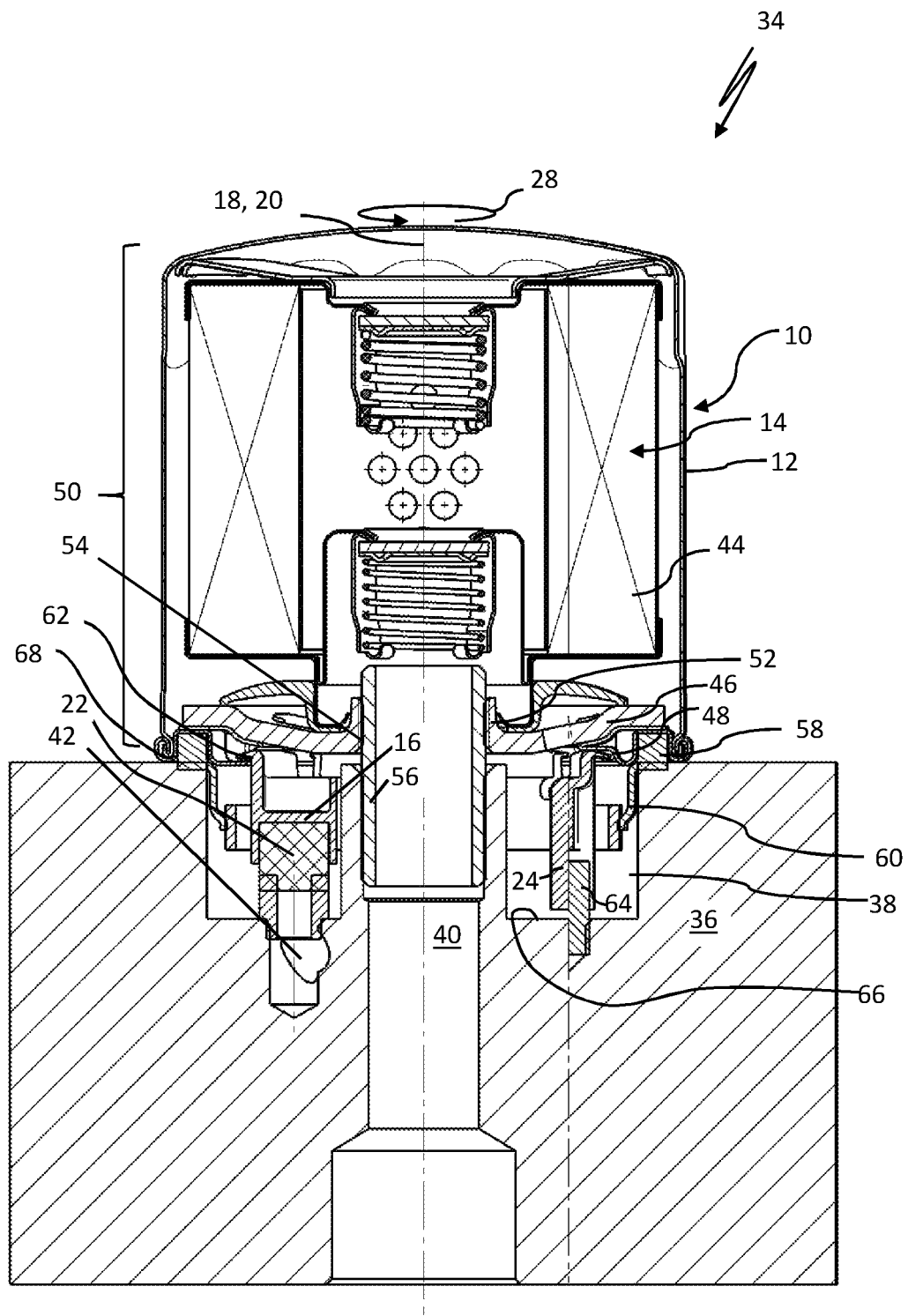
FIG. 4 shows the filter system according to FIG. 2 during mounting at a still later point in time relative to FIG. 3.
Figure 5:
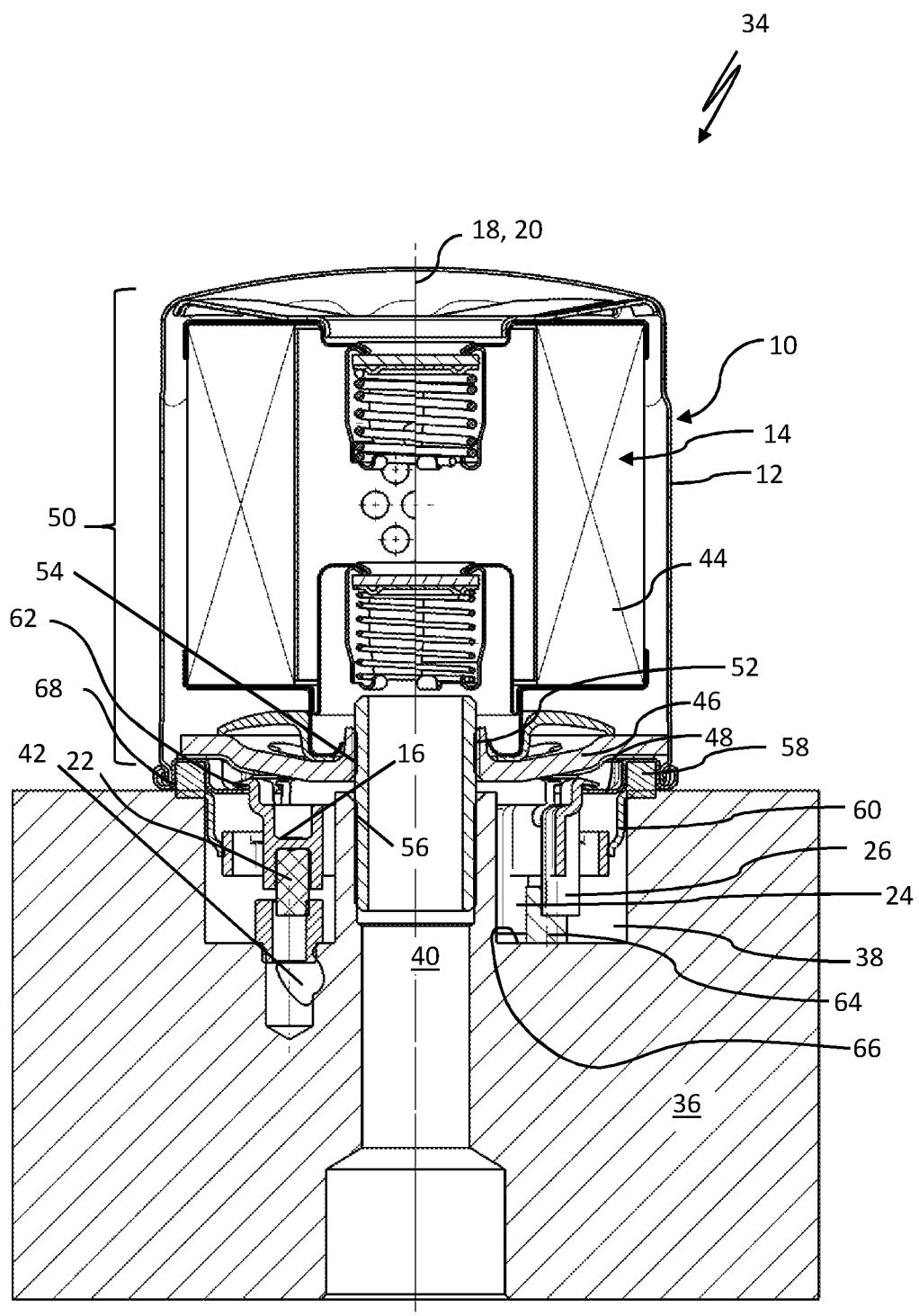
FIG. 5 shows a further filter system with a filter arranged at the filter head in its predetermined mounting position.

FIG. 5 illustrates another filter system 34 which differs from the filter system 34, previously discussed in connection with FIGS. 2 to 4, substantially in that the closure element 22 is configured as a closure plug that can be introduced into the drainage channel 42 of the filter head 36. The closure element 22 is consequently configured as a radial sealing element. Preferably, the closure element 22 is comprised of an elastomer. It should be noted that the section illustration in FIG. 5 has been selected such that the second positioning element 26 can also be readily recognized. The filter 10 is still arranged in its predetermined (operative) mounting position at the filter head 36. The closure plug extends in a sealing manner into the drainage channel 42. The second positioning element 26 may abut against the stop element 64 in circumferential direction of the support ring 16. The stop element 64 thus extends into the receptacle 30 (FIG. 1) formed between the two positioning elements 24, 26 of the support ring 16.

Figure 6:
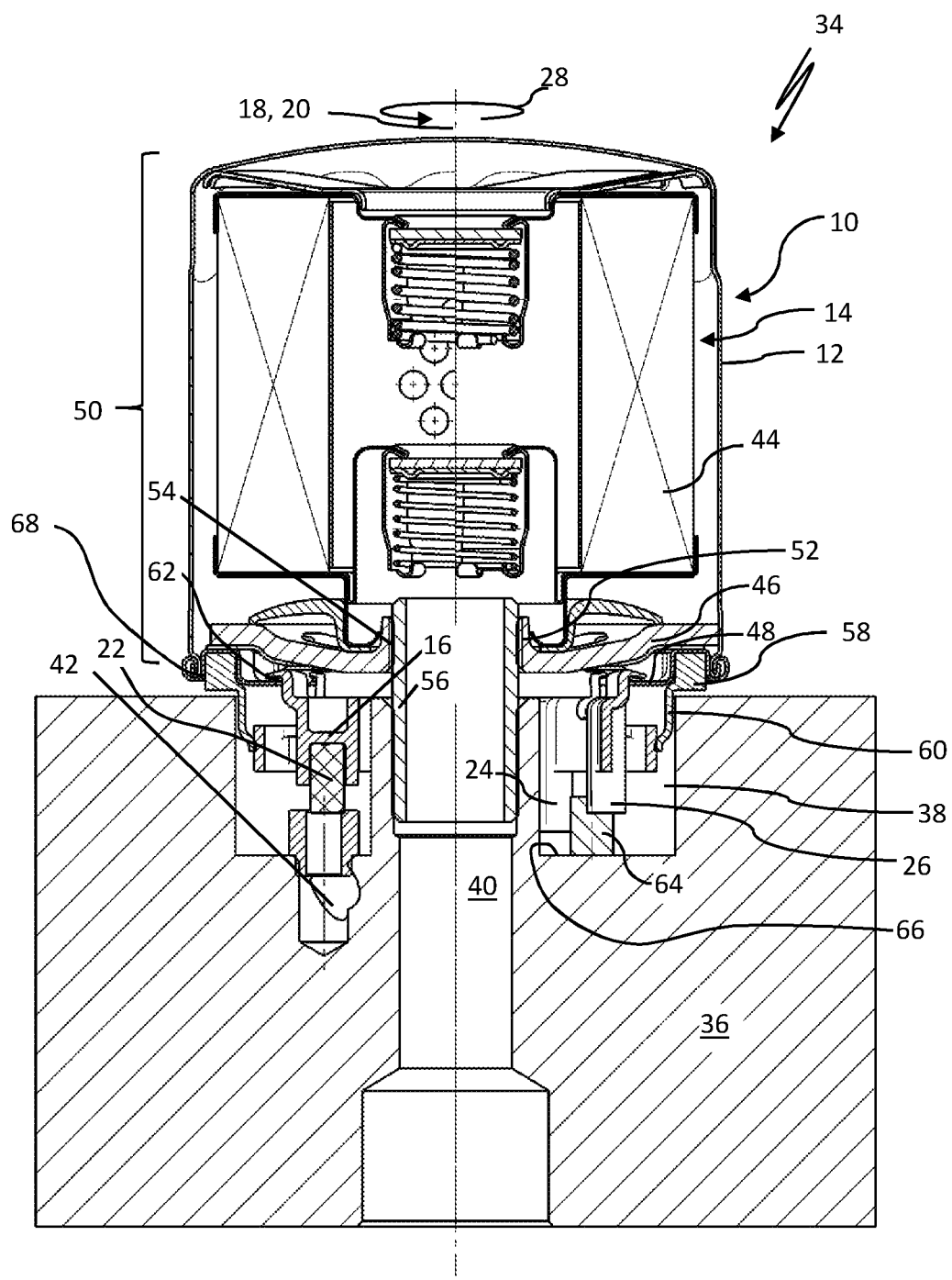
FIG. 6 shows the filter system according to FIG. 5 during unscrewing of the filter from the filter head, wherein the second positioning element abuts against a stop element of the filter head and thus prevents co-rotation of the support ring with the filter opposite to the screw-in direction.

When the filter 10 is rotated about the longitudinal axis 18 relative to the filter head 36 opposite to the screw-in direction 28 in order to release the filter 10 from the filter head 36, the second positioning element 26 prevents a co-rotation of the support ring 16 with the housing part 12. By means of an axial movement of the filter 10 that is derived from the screw-out or unscrewing movement of the filter, the support ring 16 with its closure plug can be moved in a strictly axial direction out of the drainage channel 42, as illustrated by way of example in FIG. 6. An undesired lateral load on the closure element 22 is thereby reliably prevented. The danger of tearing off of parts of the closure element 22 or of the entire closure element 22 from the support ring 16 is thus minimized.

Figure 7:
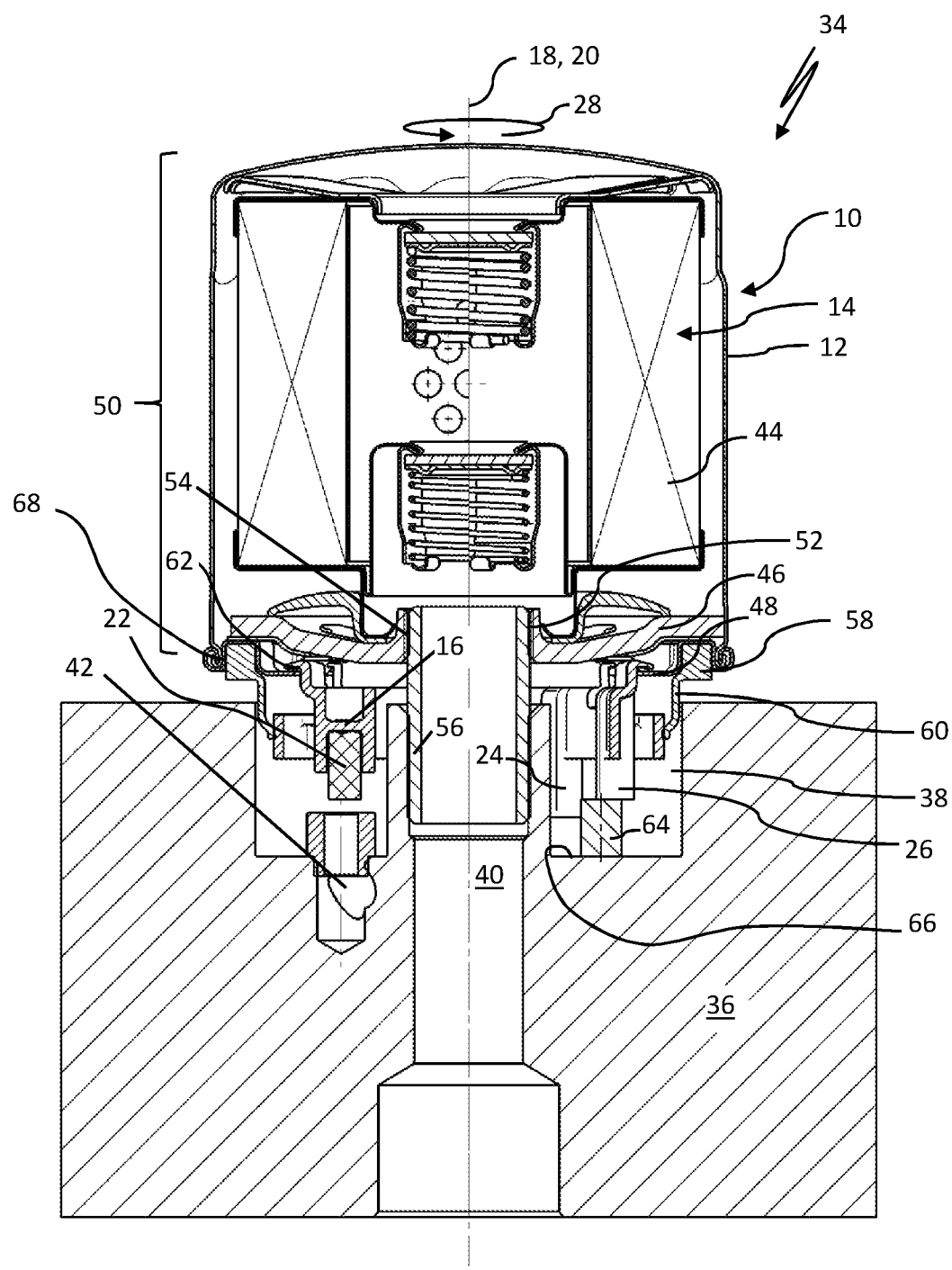
FIG. 7 shows the filter system of FIG. 5 at a point in time during de-mounting when the stop element arranged fixedly at the filter head and the positioning elements of the support ring of the filter are disengaged.

As soon as the shorter second positioning element 26 and the stop element 64 no longer overlap each other in circumferential direction of the support ring 16, co-rotation of the support ring 16 with the filter 10 opposite to the screw-in direction 28 is enabled. The second positioning element 26 and the stop element 64 as well as the closure element 22 and the drainage channel 42 are matched to each other in their spatial arrangement and dimensioning such that a rotational release of the support ring 16 opposite to the screw-in direction 28 is enabled only when the closure element 22 has been completely disengaged from the drainage channel 42 in axial direction, as illustrated in FIG. 7.

It should be noted that the filter 10, according to an embodiment that is not illustrated in the drawing, may also be configured as a conventional filter insert (without housing part 12) which can be replaceably arranged within a filter housing comprising a housing part 12 and a filter head 36. In this case, the housing part 12 is configured as a filter housing cover and serves for closing the filter head 36 that can be described in an illustrative way as cup-shaped, wherein this means that the filter head 36 comprises a fluid collecting space which is connected to the drainage channel. The housing part 12 can be screwed into a thread of the filter head 36. The filter 10 is coupled in a rotationally fixed manner to the housing part 12, in particular, is latched thereto or held in a frictionally-fixed manner thereon. In this embodiment, the filter 10 may be configured in a manner corresponding to the filter element 14 illustrated in FIGS. 1 to 7. In this case, the support ring 16 may be rotatably fastened to an end plate or support tube of the filter 10.

What is claimed is:

1. A filter system for a liquid to be filtered, the filter system comprising:
   a filter head comprising
      a drainage channel for the liquid arranged at a bottom of the filter head and
      further comprising a stop element;
   a filter embodied as a replaceable filter cartridge, the replaceable filter cartridge comprising
      a filter element arranged in a housing part of the replaceable filter cartridge, wherein
         the replaceable filter cartridge is configured to be mounted at the filter head by a screw-in movement directed about a longitudinal axis of the replaceable filter cartridge;
   the replaceable filter cartridge further comprising
      a support ring fastened to an end of the housing part so as to be rotatable relative to the longitudinal axis of the replaceable filter cartridge;
   the support ring comprising
      an eccentrically arranged closure element configured to close the drainage channel of the filter head and
      further comprising a first positioning element,
         wherein the first positioning element is configured to be guided toward the stop element of the filter head by the screw-in movement and to position the support ring relative to the filter head in a predetermined rotational position at the stop element,
         wherein in the predetermined rotational position the closure element is axially aligned with the drainage channel of the filter head,
         wherein the closure element is transferred, by an axial movement of the replaceable filter cartridge derived from the screw-in movement, into a sealing seat at the filter head to close the drainage channel when the replaceable filter cartridge is screwed onto the filter head by the screw-in movement;
   the support ring comprising
      a second positioning element configured to hold the support ring in a rotationally fixed position at the filter head when the replaceable filter cartridge is unscrewed from the filter head by an unscrewing movement directed opposite to the screw-in movement,
         wherein, in the rotationally fixed position, the closure element is moved out of the sealing seat at the filter head only in an axial direction.

2. The filter system according to claim 1, wherein
   the housing part of the replaceable filter cartridge comprises a cover,
   wherein the support ring is connected to the cover.

3. The filter system according to claim 1, wherein
   the support ring is held in the rotationally fixed position relative to the filter head by the second positioning element abutting against the stop element of the filter head.

4. The filter system according to claim 1, wherein
   at least one of the first and second positioning elements extends in a radial direction away from the support ring.

5. The filter system according to claim 4, wherein
   the first and second positioning elements are arranged radially inside a circumference of the support ring.

6. The filter system according to claim 4, wherein
   the first and second positioning elements are arranged radially outside of a circumference of the support ring.

7. The filter system according to claim 4, wherein
   the first positioning element extends past the closure element in the axial direction.

8. The filter system according to claim 1, wherein
   the first and second positioning elements are molded onto the support ring.

9. The filter system according to claim 1, wherein
   at least one of the first and second positioning elements is web-shaped.

10. The filter system according to claim 1, wherein
    the second positioning element comprises
    a beveled end face.

11. The filter system according to claim 1, wherein
    the closure element is a radial and/or axial sealing element.

12. The filter system according to claim 1, wherein
    the closure element comprises
    a radial and/or axial sealing element.

13. The filter system according to claim 1, wherein
    the support ring is fastened by hook elements to the housing part.

14. The filter system according to claim 1, wherein
    the filter head is cup-shaped, comprises a fluid collecting space, and is connected to a drainage channel,
    wherein the replaceable filter cartridge is a filter insert configured to be arranged in the filter head.

15. A filter embodied as a replaceable filter cartridge, the replaceable filter cartridge comprising:
    a filter element arranged in a housing part of the replaceable filter cartridge,
       wherein the replaceable filter cartridge is configured to be mounted at a filter head by a screw-in movement directed about a longitudinal axis of the replaceable filter cartridge;
    a support ring fastened to an end of the housing part so as to be rotatable relative to the longitudinal axis of the replaceable filter cartridge;
    the support ring comprising
       an eccentrically arranged closure element configured to close a drainage channel of the filter head and
       further comprising a first positioning element,
          wherein the first positioning element is configured to be guided toward a stop element of the filter head by the screw-in movement and to position the support ring relative to the filter head in a predetermined rotational position at the stop element,
          wherein in the predetermined rotational position the closure element is axially aligned with the drainage channel of the filter head,
          wherein the closure element is transferred, by an axial movement of the replaceable filter cartridge derived from the screw-in movement, into a sealing seat at the filter head to close the drainage channel of the filter head when the replaceable filter cartridge is screwed onto the filter head by the screw-in movement;
    the support ring comprising
       a second positioning element configured to hold the support ring in a rotationally fixed position at the filter head when the replaceable filter cartridge is unscrewed from the filter head by an unscrewing movement directed opposite to the screw-in movement, wherein, in the rotationally fixed position, the closure element is moved out of the sealing seat at the filter head only in an axial direction.

16. The filter according to claim 15, wherein at least one of the first and second positioning elements extends in a radial direction away from the support ring.

17. The filter according to claim 15, wherein the first and second positioning elements are arranged radially inside a circumference of the support ring.

18. The filter according to claim 15, wherein the first and second positioning elements are arranged radially outside of a circumference of the support ring.

19. The filter according to claim 15, wherein the first positioning element extends past the closure element in the axial direction.

20. A method for inserting or exchanging the replaceable filter cartridge of the filter system according to claim 1, comprising:
    mounting the replaceable filter cartridge at the filter head of the filter system by a screw-in movement directed about the longitudinal axis of the replaceable filter cartridge,
    guiding the first positioning element toward the stop element of the filter head by the screw-in movement and
    positioning the support ring relative to the filter head in the predetermined rotational position at the stop element,
    wherein in the predetermined rotational position the closure element is arranged axially aligned relative to the drainage channel of the filter head;
    transferring the closure element by an axial movement of the replaceable filter cartridge derived from the screw-in movement into the sealing seat at the filter head and closing the drainage channel with the closure element;
    holding the support ring in a rotationally fixed position at the filter head with the second positioning element when unscrewing the replaceable filter cartridge from the filter head by an unscrewing movement directed opposite to the screw-in movement and,
    in the rotationally fixed position at the filter head, moving the closure element out of the sealing seat at the filter head only in an axial direction.

* * * * *